United States Patent
Eiglmeier

[11] 3,865,879
[45] Feb. 11, 1975

[54] PROCESS FOR THE PREPARATION OF PERI-INDENONES

[75] Inventor: Kurt Eiglmeier, Rosdert, Germany

[73] Assignee: Hoechst Aktiengesellschaft, Frankfurt, Main, Germany

[22] Filed: Feb. 26, 1973

[21] Appl. No.: 336,006

[30] Foreign Application Priority Data
Mar. 1, 1972  Germany............................ 2209692
Dec. 22, 1972  Germany............................ 2262857
Dec. 22, 1972  Germany............................ 2262858

[52] U.S. Cl. .......... 260/590, 260/465 F, 260/465 G
[51] Int. Cl... C07c 49/76, C07c 49/80, C07c 49/82
[58] Field of Search ...................................... 260/590

[56] References Cited
UNITED STATES PATENTS
2,145,905  2/1939  Weinmayr........................... 260/590
2,193,674  3/1940  Haberland ......................... 260/590
3,775,486  11/1973  Chinn ................................. 260/590

Primary Examiner—Daniel D. Horwitz
Attorney, Agent, or Firm—Curtis, Morris & Safford

[57] ABSTRACT

Process for the preparation of carbocylic indenones of the formula (1)

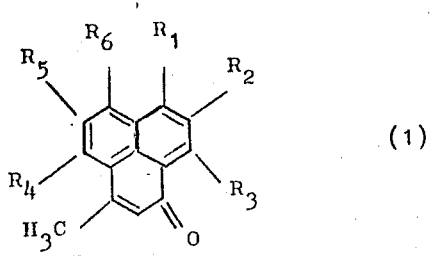

wherein $R_1$ through $R_6$ each are hydrogen, fluorine, chlorine, nitro, trifluoromethyl, alkyl and/or alkoxy, each having from 1 to 4 carbon atoms, and/or two adjacent radicals each of $R_1$ through $R_6$ together form a single or multiple carbocyclic aromatic ring, or two or more radicals together form a carbocyclic aromatic system, or the radicals $R_1$ and $R_6$ together form the radical of the formula $-CH_2-CH_2-$, which comprises reacting carbocyclic aromatic compounds ahving a free peri-group and corresponding to the formula (2)

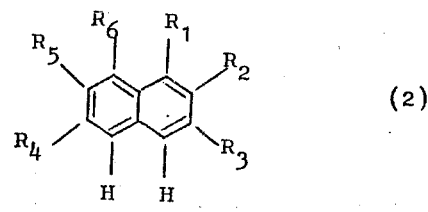

where $R_1$ through $R_6$ are as defined above, with acetoacetyl fluoride in at least 90 % hydrofluoric acid at temperatures of from $-10°$ to $+120°C$, optionally after a 2 hours residence time of the reaction mixture in a temperature range of from $-20°$ to $-50°C$, which is a novel process yielding peri-indenones with substantially higher yields and in higher degree of purity than known processes, or yielding peri-indenones which are not obtained by the known processes.

12 Claims, No Drawings

PROCESS FOR THE PREPARATION OF PERI-INDENONES

The present invention relates to a process for the preparation of peri-indenones.

It is known that peri-acenaphthindenones of formula I

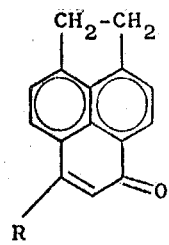

where R is hydrogen or methyl, can be obtained according to different methods. Thus, they may be formed as by-product (R= H) when 5-acenaphthylpropionic acid is treated with $P_2O_5$/85 % $H_3PO_4$ [Liebigs Ann. Chem. 585, page 1 (1954], or $AlCl_3$ (Compt. Rend. hebd. Seances Acad. Sci. 214, page 493 (1942); Chem. Abstr. 37, page 2370 (1943)), or by cyclization of 5-cinnamoyl-acenaphthene with $AlCl_3$ (id. Compt. Rend.); the starting product being obtainable from acenaphthene and cinnamic acid chloride/$AlCl_3$ (id.), or from 5-bromo-acenaphthene (id.) or 5-acetyl-acenaphthene.

Compounds of formula I where R is $CH_3$ are obtained by reaction of acetoacetic ester and acenaphthene in anhydrous hydrofluoric acid at 90°C (German Pat. Specification No. 753 210), but the yield is only 23 %.

The disadvantage common to all hitherto known processes is the poor yield of peri-acenaphthindenone, relative to acenaphthene. Moreover, temperatures of at least 80°C are generally necessary, which require the use of an autoclave when HF is employed. Most of the processes are multi-step methods, and aluminium chloride used as condensation agent is lost in the work-up operations. It has now been found that, while avoiding these disadvantages, there can be prepared quite generally carbocyclic indenones of the formula (1)

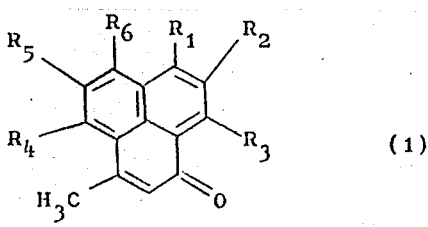

where $R_1$ through $R_6$ each are hydrogen, fluorine, chlorine, nitro, trifluoromethyl, alkyl and/or alkoxy, each having from 1 to 4 carbon atoms, and/or two adjacent radicals each of $R_1$ through $R_6$ together form a single or multiple carbocyclic aromatic ring, or two or more radicals together form a carbocyclic aromatic system, or the radicals $R_1$ and $R_6$ together form the radical of the formula $-CH_2-CH_2-$, by reacting carbocyclic, aromatic compounds having a free perigroup and corresponding to the formula (2)

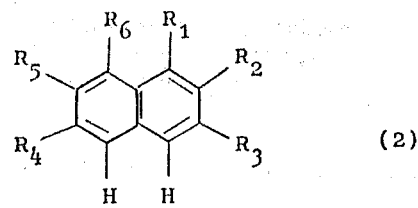

where $R_1$ through $R_6$ are as defined above, with acetoacetyl fluoride in at least 90 % hydrofluoric acid.

A preferred and especially advantageous embodiment of the process of the invention is the preparation of 5-methyl-peri-acenaphthindenone-(7), for which the radicals $R_2$ through $R_5$ of formula (1) are hydrogen, and $R_1$ and $R_6$ together form an ethylene bridge, from acenaphthene as starting compound.

Contrary to the cited known reaction with acetoacetic ester, the reaction of the present invention can be carried out at temperatures starting from −10°C. Though the reaction proceeds satisfactorily even at temperatures as elevated as +120°C, a temperature of from 10° to 60°C is preferred, especially from 10° to 40°C, and most advantageously from 10° to 20°C. In the case where acenaphthene is used as a starting compound, and the reaction temperature is in the preferred range mentioned pressure of the hydrofluoric acid alone, the autogenous is such as permit operation without special pressure vessels.

An especially advantageous embodiment of the procedure of reacting the compounds of formula (2) with acetoacetyl fluoride to achieve an increase of yield and conversion rate is the following: the starting compound of formula (2) and acetoacetyl fluoride is dissolved in the hydrofluoric acid, advantageously at a temperature below 0°C, preferably down to −20°C, most advantageously at from −25° to −40°C, and the reaction mixture is heated to the desired reaction temperature, for example room temperature, advantageously with stirring, preferably after a residence time of from 2 to 8 hours at temperatures of from −20° to −50°C, especially from −25° to −40°C.

The residence time of the reactants in this low temperature range, in which the acetoacetyl fluoride is added on the compound of formula (2), depends on the temperature. Longer periods are necessary at lower temperatures. Generally, the residence time is from 2 to 8, preferably from 3 to 5 hours. Periods less than 2 hours do not bring about an yield, but still provide a substantial improvement over the procedure without this residence time. Periods longer than 8 hours are possible, but not advantageous.

After this residence time of several hours at a temperature below −20°C as indicated above, the reaction mixture is heated, advantageously with stirring, to the desired reaction temperature of −10° to +120°C, and the reaction is continued at these temperatures; the reaction time, depending on the reaction temperature and the hydrofluoric acid concentration, and being from several minutes to 1 day, for example from about 5 to 8 hours at room temperature and in the presence of anhydrous hydrofluoric acid.

Preferred vessel materials, besides plastics such as polyethylene polypropylene or polyvinyl chloride, are metals, especially steel. Temperatures above 120°C are possible, but do not bring about any advantages.

The reaction pressures correspond generally to the autogenous pressure of the hydrofluoric acid used. This acid should contain at least 90 % by weight of hydrogen fluoride, relative to the water present, but preferably from 95 to 100 %, especially from 98 to 100 %.

The starting compound of formula (2) and the acetoacetyl fluoride are used in about equimolar amounts; preferably an excess of acetoacetyl fluoride of from 5 to 30 mole %, relative to the compound of formula (2), is employed.

The amount of hydrofluoric acid used is from 1 to 20 parts per 1 part of the compound of formula (2), preferably from 3 to 10 parts (the parts cited in this specification being always by weight).

The reactants may be added in any desired sequence, one of them or both may advantageously be added continuously. Also the process as a whole may be carried out continuously in a simple manner by introducing all three components simultaneously and steadily into the corresponding reaction vessel or tube. Instead of acetoacetyl fluoride, the analogous chloride, which reacts with hydrofluoric acid to form fluoride, may also be used.

In accordance with a preferred embodiment the acetoacetyl fluoride is formed in situ by addition of diketene to excess hydrofluoric acid (Houben-Weyl, Methoden der organischen Chemie, 4th edition, Vol. 7/4, p. 251) in the presence or absence of the compound of formula (2), preferably at the low temperatures as indicated, and the reaction is then completed at the cited reaction temperatures.

The excess of hydrofluoric acid for this preparation of acetoacetyl fluoride should be advantageously chosen in such a manner that, with deduction of the consumption for the formation of acetoacetyl fluoride, the amounts of hydrofluoric acid indicated for the reaction with the compound of formula (2) are attained.

After the reaction is complete, the hydrofluoric acid is advantageously distilled off together with any excess acetoacetyl fluoride and the acid may be reused for further batches, if necessary after its reconcentration. The final products of formula (1) obtained may be converted to high-purity compounds according to known methods (recrystallization, chromatography).

Suitable starting compounds of the general formula (2) are all condensed carbocyclic aromatics substituted or unsubstituted at the cyclic system, which contain at least one free peri-group.

Besides the already mentioned acenaphthene, especially naphthalene and the substitution products thereof, and the condensed cyclic systems thereof can be mentioned as starting materials of formula (2) for the process of the invention. Especially suitable, besides naphthalene, are anthracene, naphthacene or pyrene, which contain preferably chlorine, alkyl and/or alkoxy groups each having from 1 to 4 carbon atoms, as single or multiple substituents, but which may contain also nitro, trifluoromethyl groups and/or fluorine. The naphthalene compounds substituted by methoxy, ethoxy, methyl and/or ethyl are the most preferred starting compounds, among which may be cited for example: 1-methyl-, 2-methyl-, 1-ethyl-, 2-ethyl-, 2,6-dimethyl-, 1,2,6-trimethyl-, 1-methoxy-, 2-methoxy-, 1-ethoxy-, 2-ethoxy-, 1,3-dimethoxy-, 1,6-diethoxy-, 1,8-dimethoxy-, 2,3-diethoxy-, 1,2,3-trimethoxy-, 1,3,6-tributoxy-naphthalene. Especially advantageous are the naphthalenes mono- or disubstituted in 1-, 2- and/or 7-position by methyl and/or ethyl. Besides anthracene or pyrene which may be advantageously substituted by methyl and/or methoxy groups, also chloropyrene is a suitable starting compound of formula (2) for the process of the invention.

The compounds of formula (1) prepared according to the process of the invention, especially those prepared from the starting substances indicated as preferred, such as the naphthalene derivatives, especially acenaphthene, are suitable as vat dyestuff (German Pat. Specification No. 867 725) or for the preparation of a vat dyestuff, or, advantageously, as intermeditate products for the manufacture of pigment dyestuffs and optical brighteners, respectively.

The process of the present invention is distinguished from known processes for the preparation of corresponding or analogous peri-indenones of formula (1) by the advantageous facts that the final products are obtained with substantially higher yields and in a higher degree of purity, and that the process of the invention is a single-step process. Moreover, the aluminium chloride used as condensation agent in known processes is lost in the work-up. Furthermore, with the process of the present invention, it is possible to operate at substantially lower temperatures.

The following examples illustrate the invention.

EXAMPLE 1

100 Parts of anhydrous hydrofluoric acid are added to 30.8 parts of acenaphthene in a steel vessel at −10°C. At this temperature and with stirring, 20 parts of diketene are subsequently added in portions. The temperature is allowed to rise to room temperature and stirring is continued for 7 hours. After distilling off the hydrofluoric acid, water is added to the residue, and after filtration and drying, 44 parts of yellow-green crystals are obtained. The crude product contains the desired indenone in a purity degree of 80 % (according to ultraviolet spectrascopic analysis), which corresponds to a theoretical indenone yield of 80 %, relative to the acenaphthene used.

After removal of the impurities by boiling with carbon tetrachloride, and optionally after recrystallization in methanol, this product, having a melting point of 152°C, is obtained in pure form in a yield of from 32 to 34 parts by weight.

EXAMPLE 2

100 Parts of anhydrous hydrofluoric acid are added to 15.4 g of acenaphthene in a shaking autoclave made from steel (250 ml) at 0°C. With further cooling, 10 ml of diketene are added in portions, and after closing the autoclave, the contents are heated for 30 minutes at 120°C with shaking; the pressure attaining 17 atm/gage in this operation. After cooling, the reaction product is worked up as described in Example 1. Yield: 22 g of substance, containing 17.6 g of pure substance, which corresponds to 80 % of the theoretical yield. From this yield, 15 g of pure substance having a melting point of 152°C are obtained.

EXAMPLE 3

100 Parts of anhydrous hydrofluoric acid are added, while stirring, to 30.8 parts of acenaphthene in a steel vessel at −35°C. Subsequently, at this temperature and with agitation, 20 parts of diketene are added in portions. Stirring is continued for 3 hours at this temperature, which is then allowed to rise to 20°C within 2 hours, and stirring is continued for a further 3 hours at 20°C, before heating at 70°C for 1 hour. After cooling, the hydrofluoric acid is distilled off, and water is added to the residue. After filtration and drying, 44 parts of yellow-green crystals are obtained containing the desired indenone in a purity degree of 90 % (according to ultraviolet spectroscopic analysis), which corresponds to a theoretical yield of 90 % of indenone, relative to the acenaphthene used. This product, after recrystallization from methanol, is obtained in pure form with a yield of from 36 to 37 parts by weight (75 % of the theoretical yield) and a melting point of 152°C.

EXAMPLE 4

100 Parts of anhydrous hydrofluoric acid are added to 30.8 parts of acenaphthene in a steel vessel at −45°C. Subsequently, at this temperature and with agitation, 20 parts of diketene are added in portions. Stirring is continued for 7 hours at this temperature, which temperature is then allowed to rise overnight to room temperature and the reaction mixture is heated subsequently at 70°C for 30 minutes.

Subsequently, the reaction product is worked up as described in Example 3.

43 Parts of a yellow-green crude product are obtained, containing the indenone in a purity degree of 94 %, which corresponds to a theoretical yield of 92 %.

EXAMPLE 5

10 ml of diketene are added in portions to 15.8 g of 1-methoxy-naphthalene in 100 ml of anhydrous hydrofluoric acid at −20°C. After 4 hours, the mixture is allowed to react overnight at room temperature and then heated at 50°C for 1 hour. After the usual work-up, yellow-orange crystals are obtained which, according to ultraviolet spectroscopic analysis, yield 84 % of the theoretical yield. By recrystallization from acetonitrile, yellow crystals of 3-methyl-7-methoxy-phenalenone-1 having a melting point of 181°C are obtained.

EXAMPLE 6

By the same operation mode as described in Example 5, 3,7-dimethyl-phenalenone-1 having a melting point of 121°C is obtained in a 70 % yield from 1-methyl-naphthalene.

EXAMPLE 7

20 ml of diketene are added in portions to 31.6 g of 2-methoxy-naphthalene in 100 ml of anhydrous hydrofluoric acid in a 250 ml shaking autoclave made from steel, at 0°C and with cooling. After closing the autoclave, the reaction mixture is shaken for 4 hours at room temperature, and subsequently heated for 30 minutes at 120°C; the pressure in the reaction vessel then attaining 17 atm/gage. After cooling, the mixture is worked up as described in the foregoing Examples.

A yellow-orange oil is obtained which slowly solidifies. According to an ultraviolet spectrascopic determination, the yield is 85 %, relative to the 2-methoxy-naphthalene used.

By recrystallization, yellow crystals of 3-methyl-9-methoxy-phenalen-one-(1) having a melting point of 160°C and corresponding to the following formula

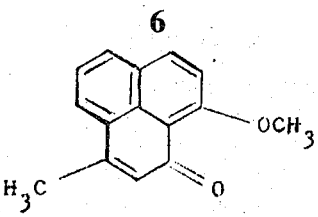

are obtained.

This compound is obtained with the same good result when, after the addition of the diketene, the reaction mixture is heated immediately at 120°C for 30 minutes. Furthermore, the substance is obtained with a similar yield and purity when the reaction proceeds for 2 hours at 60°C.

EXAMPLE 8

9 ml of diketene are added, while stirring, to 18.8 g of 2.7-di-methoxy-naphthalene in 100 ml of anhydrous hydrofluoric acid in a 250 ml polyethylene vessel at −20°C. The reaction mixture is allowed to slowly attain room temperature, and agitation is continued for 7 hours at 20° to 25°C.

After work-up as described in the foregoing Examples, an oil is obtained to which water is added and which is extracted with methylene chloride. After separation of the solvent, yellow crystals are obtained. Yield: 17.8 g ( = 70 % of the theoretical yield).

After recrystallization from acetonitrile, yellow needles of 3-methyl-4,9-dimethoxy-phenalenone-(1) having a melting point of 194°C are obtained.

EXAMPLE 9

150 ml of anhydrous hydrofluoric acid are added to 27.0 g of 2,6-dimethyl-naphthalene in a 250 ml shaking autoclave made from steel at 0°C. 16.0 ml of diketene are added in portions. After closing the autoclave, the reaction mixture is shaken overnight at 20°C and subsequently heated at 50°C for 2 hours. After the aforementioned usual work-up, a yellow oil is obtained to which water is added and which is extracted with methylene chloride.

The extracted product is separated by column chromatography using silica gel (diameter from 0.05 to 0.2 mm) into 19.2 g of 3,5,9-trimethyl-phenalenone-(1) (= 50 % of the theoretical yield), and 11.5 g of 3,4,8-trimethyl-phenalenone-(1) (= 30 % of the theoretical yield).

A determination of the structure of the single substance is possible by NMR spectroscopy.

EXAMPLE 10

100 ml of anhydrous hydrofluoric acid and 10 ml of diketene (in portions) are added at −30°C to 17.8 g of anthracene in a polyethylene vessel which can be closed. The reaction mixture is maintained at this temperature for 2 hours, subsequently heated to room temperature within 4 hours, then for 2 hours at 60°C in a steel vessel. After cooling, the reaction product is worked up as described in the foregoing Examples. According to an ultraviolet spectroscopic determination, 22 g of a crude product containing 70 % of the theoretical yield of 3-methyl-8,9-benzophenalenone-(1) are obtained.

After recrystallization from acetonitrile, orange crystals of 3-methyl-8,9-benzophenalenone-(1), having a melting point of 182°C, are obtained.

EXAMPLE 11

40.4 g of pyrene are added at −30°C to a mixture of 20 ml of diketene and 125 ml of anhydrous hydrofluoric acid prepared at −30°. The reaction is carried out in a steel autoclave. The reaction mixture obtained is first shaken overnight at room temperature, and then heated at 50°C for 4 hours. After the usual work-up, 54 g of yellow crystals are obtained containing 94 % of the desired indenone (according to ultraviolet spectroscopic analysis), which corresponds to 95 % of the theoretical yield.

After digestion with hot acetonitrile, yellow-orange crystals of 5-methyl-3-H-benzo-[c,d]-pyrene-3-one having a melting point of 236°C are obtained.

According to one of the operation modes described correspondingly in the afore-mentioned Examples, the compounds of the following Table are obtained:

TABLE

| Ex. | Starting product | Final product | Melting point (°C) | Yield in % | $\lambda$ max (m$\mu$) |
|---|---|---|---|---|---|
| 12 | naphthalene | 3-methyl-phenalenone-1<br>$C_{14}H_{10}O$ molecular weight 194 | 151 | 50 | |
| 13 | 1-methylnaphthalene (CH$_3$) | 3,7-dimethyl-phenalenone-1<br>$C_{15}H_{12}O$ MW 208 | 121 | 70 | 364, 386 |
| 14 | 1-methoxynaphthalene (OCH$_3$) | 3-methyl-7-methoxy-phenalenone-1<br>$C_{15}H_{12}O_2$ MW 224 | 181 | 85 | 403, 430 (shoulder) |
| 15 | 2,6-dimethoxynaphthalene (H$_3$CO, OCH$_3$) | 3-methyl-4,9-dimethoxy-phenalenone-1<br>$C_{16}H_{14}O_3$ MW 254 | 194 | 70 | 378, 413 and 440 (shoulder) |
| 16 | 2-methoxynaphthalene (OCH$_3$) | 3-methyl-9-methoxy-phenalenone-1<br>$C_{15}H_{12}O_2$ MW 224 | 160 | 85 | 405, 425 (shoulder) |
| 17 | 2,6-dimethyl (H$_3$C, CH$_3$) | 3,4,8-trimethyl-phenalenone-1<br>$C_{16}H_{14}O$ MW 222 | 171 | 30 | 380, 412 (shoulder) |
| 18 | 2,7-dimethyl (H$_3$C, CH$_3$) | 3,5,9-trimethyl-phenalenone-1<br>$C_{16}H_{14}O$ MW 222 | 162 | 50 | 393 |
| 19 | 2,6-dimethyl (H$_3$C, CH$_3$) | 3,4,9-trimethyl-phenalenone-1<br>$C_{16}H_{14}O$ MW 222 | 144 | 70 | 364, 395 (shoulder) |

I claim:

TABLE (contd.)

| Ex. | Starting product | Final product | Melting point (°C) | Yield % | λ max (mµ) |
|---|---|---|---|---|---|
| 20 | (1,6-dimethylnaphthalene structure) | 3,4,7-trimethyl-phenalenone-1  $C_{16}H_{14}O$  MW 222 | 151 | 50 | 372, 391 |
| 21 | (1,7-dimethylnaphthalene structure) | 3,6,9-trimethyl-phenalenone-1  $C_{16}H_{14}O$  MW 222 |  | 30 | 387 |
| 22 | (anthracene structure) | 3-methyl-8,9-benzo-phenalenone-1  $C_{18}H_{12}O$  MW 244 | 182 | 70 | 462, 488 (shoulder) |
| 23 | (pyrene structure) | 5-methyl-3-H-benzo-[c,d]-pyrene-3-one  $C_{20}H_{12}O$  MW=268 | 236 | 95 | 396, 407 (shoulder) |
| 24 | (chloropyrene structure) | 5-methyl-7-chloro-3-H-benzo-[c,d]-pyrene-3-one  $C_{20}H_{11}ClO$  MW=302.5 | from 235°C decomp. | 70 | 400, 423 (shoulder) |
|  |  | 5-methyl-9-chloro-3-H-benzo-[c,d]-pyrene-3-one  $C_{20}H_{11}ClO$  MW=302.5 | (Isomer ratio acc. to NMR-spectr. abt. 1:2) |  |  |

1. Process for the preparation of carbocyclic indenones of the formula (1)

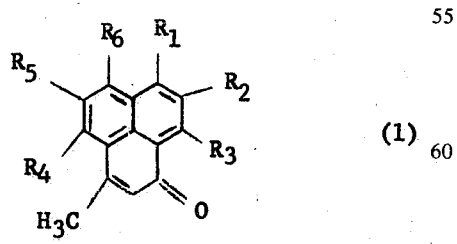

where $R_1$ through $R_6$ each are hydrogen, fluorine, chlorine, nitro, trifluoromethyl, alkyl or alkoxy, said alkyl and alkoxy radicals having from 1 to 4 carbon atoms, two adjacent radicals $R_1$ through $R_6$ may together form a single or multiple carbocyclic aromatic ring, two or more radicals $R_1$ through $R_6$ may together form a carbocyclic aromatic system, and the radicals $R_1$ and $R_6$ may together form —$CH_2$—$CH_2$—, which comprises reacting carbocyclic aromatic compounds having a free peri-group and corresponding to the formula (2)

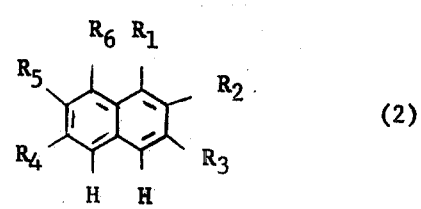

where $R_1$ through $R_6$ are as defined above, with acetoacetyl fluoride in at least 90 % hydrofluoric acid at temperatures of from —10° to +120°C.

2. Process as claimed in claim 1, wherein the acetoacetyl-fluoride is prepared by reaction of diketene with excess hydrofluoric acid and the acetoacetyl fluoride is reacted with compounds of the formula (2) without further isolation.

3. Process as claimed in claim 1 wherein the reaction is carried out at temperatures of from 10° to 60°C.

4. Process as claimed in claim 1, wherein acenaphthene is used as starting compound of the formula (2).

5. The process defined in claim 1 wherein $R_2$ and $R_3$ together are —CH=CH—CH=CH—.

6. A process as defined in claim 1 wherein the reaction mixture is maintained at −20° to −50°C. for a period of at least 2 hours, and thereafter heated to the reaction temperature of −10° to 120°C.

7. A process as defined in claim 1 wherein the compound of formula (2) is pyrene or a chloropyrene.

8. A process as defined in claim 1 wherein the compound of formula (2) is

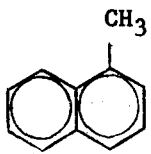

and the compound of formula (1) is

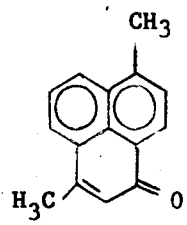

9. A process as defined in claim 1 wherein the compound of formula (2) is

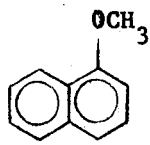

and the compound of formula (1) is

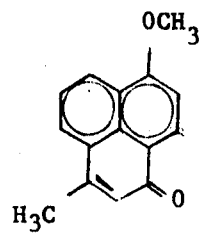

10. A process as defined in claim 1 wherein the compound of formula (2) is

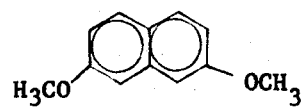

and the compound of formula (1) is

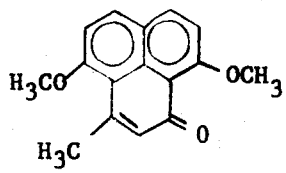

11. A process as defined in claim 1 wherein the compound of formula (2) is

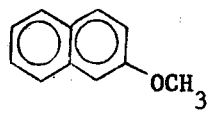

and the compound of formula (1) is

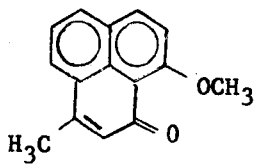

12. A process as defined in claim 1 wherein the compound of formula (2) is

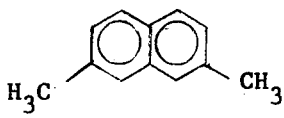

and the compound of formula (1) is

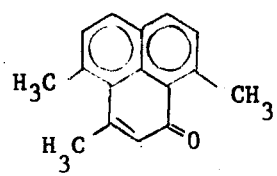

* * * * *